No. 729,088. PATENTED MAY 26, 1903.
M. P. OSBOURN.
FEED WATER HEATER, FILTER, AND PURIFIER.
APPLICATION FILED JULY 31, 1901.
NO MODEL. 2 SHEETS—SHEET 1.

Witnesses:
Louis D. Heinrichs
P. M. Kelly

Inventor
Millard P. Osbourn
By [signature]
Atty

No. 729,088. PATENTED MAY 26, 1903.
M. P. OSBOURN.
FEED WATER HEATER, FILTER, AND PURIFIER.
APPLICATION FILED JULY 31, 1901.
NO MODEL. 2 SHEETS—SHEET 2.
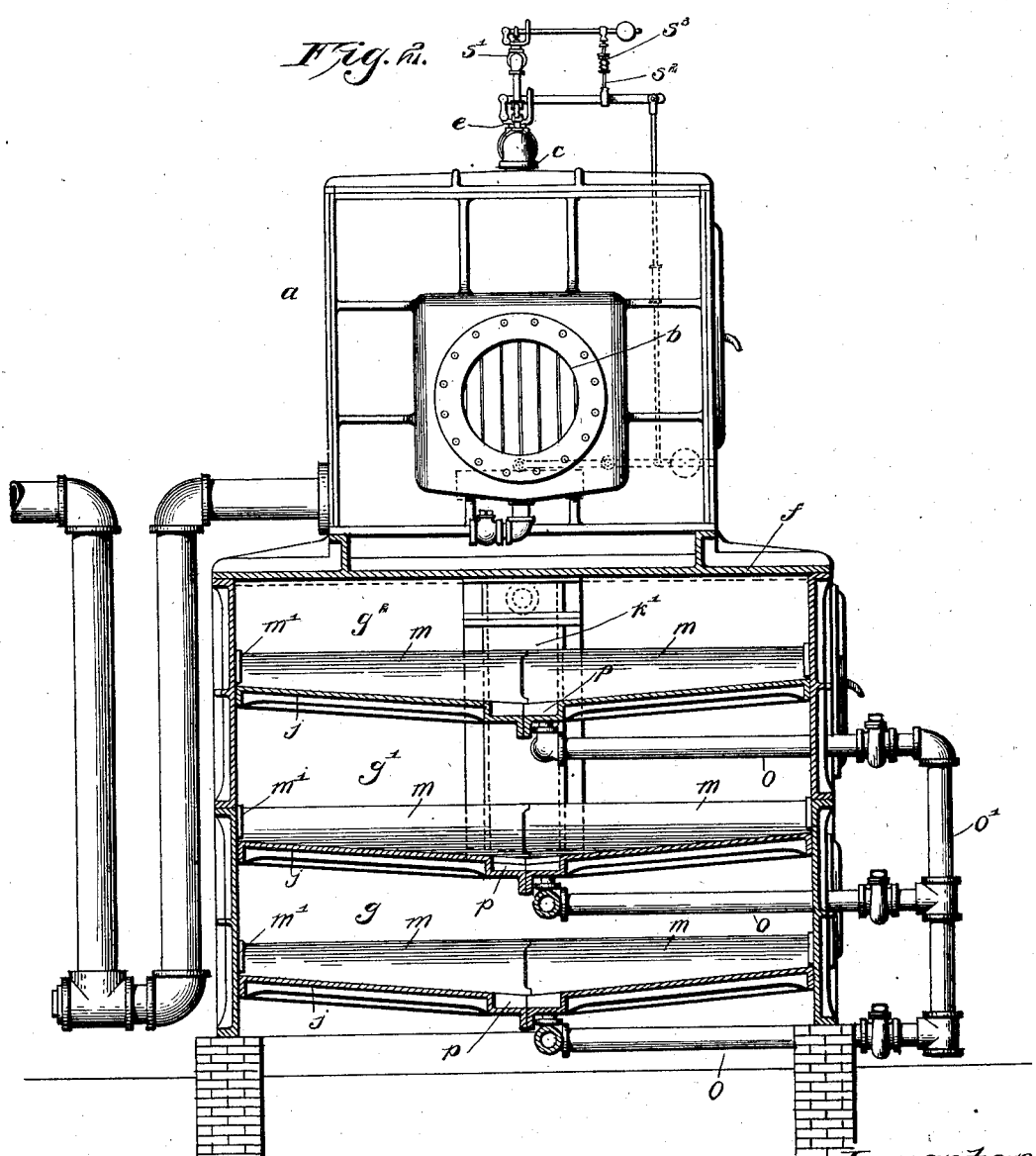

No. 729,088. Patented May 26, 1903.

UNITED STATES PATENT OFFICE.

MILLARD P. OSBOURN, OF CAMDEN, NEW JERSEY, ASSIGNOR TO WARREN WEBSTER AND COMPANY, A CORPORATION OF NEW JERSEY.

FEED-WATER HEATER, FILTER, AND PURIFIER.

SPECIFICATION forming part of Letters Patent No. 729,088, dated May 26, 1903.

Application filed July 31, 1901. Serial No. 70,336. (No model.)

*To all whom it may concern:*

Be it known that I, MILLARD P. OSBOURN, of the city and county of Camden, and State of New Jersey, have invented an Improvement in Feed-Water Heaters, Filters, and Purifiers, of which the following is a specification.

My invention relates to feed-water heaters, filters, and purifiers; and it consists of the improvements which are fully set forth in the following specification and are shown in the accompanying drawings.

Part of my improvements relate to a feed-water heater and purifier in which chemical purifying agents are mixed with the water to precipitate the carbonates and impurities contained therein and embrace means for supplying the purifying agents to the heater and automatically regulating the supply thereof by the conditions within the heater or by the water-supply, and also means for heating the purifying agents and maintaining them in heated condition while they are being fed to the heater.

Part of my improvements relate to the purifying and filtering devices whereby the heated water alone or in combination with the purifying agents is subjected to a settling process by which the carbonates and impurities are precipitated and separated from the water and purified water only is allowed to flow out either directly or after passing through a filter to remove impurities held in suspension after the settling process.

Figure 1:
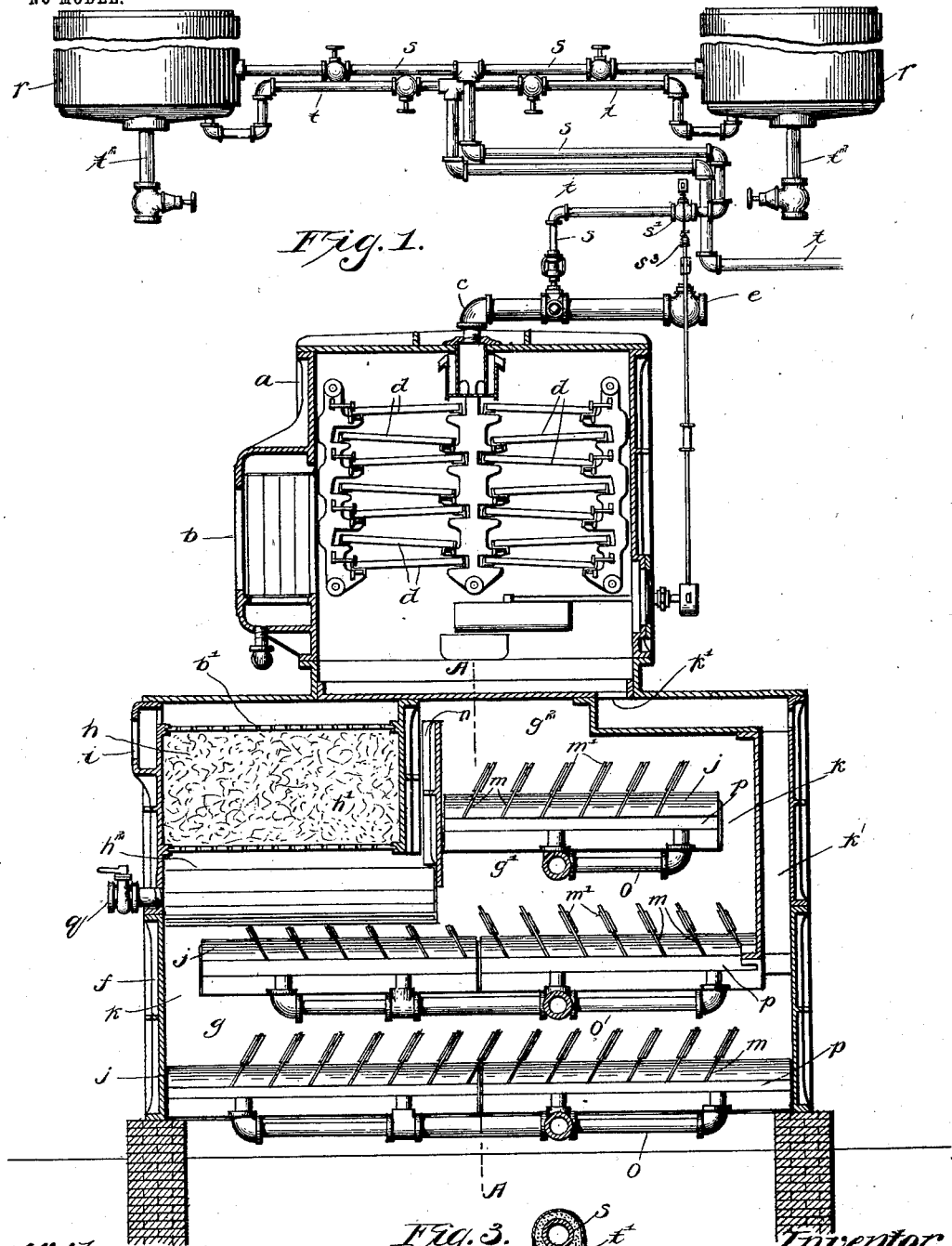
Figure 3:
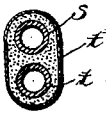

In the drawings, Figure 1 is a vertical sectional view of a feed-water heater, filter, and purifier embodying my invention. Fig. 2 is a front elevation of the same with the filter in vertical section on the line A A of Fig. 1. Fig. 3 is a cross-sectional view of the chemical-supply pipe and steam-pipe, showing how they may be inclosed in a common covering.

$a$ is the feed-water heater, which may be of any suitable construction. As shown it is of the well-known "Webster" type of open heaters, having a supply-inlet $b$ for exhaust-steam and a water-inlet $c$, with a series of open trays $d$ within the body of the heater, over which the water passes, dropping successively from one tray to another and coming into direct contact with the steam. The water-supply is controlled by a float-controlled valve $e$ in the water-supply pipe $c$.

$f$ is the filter and purifier, which consists of an outer body below the heater provided with one or more communicating purifying-chambers $g\ g'\ g^2$ and a filtering-chamber $h$, through which the purified water passes to the supply-outlet $i$.

In the construction shown the purifying-chambers $g\ g'\ g^2$ are formed by pans $j$, arranged one above the other within the body of the filter and purifier $f$, with communicating passage-ways $k$ between the lower chambers and those above. A passage-way $k'$ leads from the heater $a$ to the lower chamber $g$.

The purifying-chambers are provided at the lower portion with one or more barriers or partitions $m$, forming an obstruction to the passage of the water in the lower part of the chamber, but leaving a clear space for the water above the barriers. These barriers form settling pockets or receptacles for water and receive the precipitated impurities, while the upper and purer body of water passes through the passage-ways $k$ into the next purifying-chamber or to the outlet. These obstructing-barriers preferably consist of a series of transverse partitions $m$, inclined, as shown, opposite to the direction of the flow of the water. These partitions may be supported by lugs $m'\ m'$ on the side walls of the filter $f$.

The filtering-chamber $h$, which may be filled with any suitable filtrant between reticulated or filtering screens $h'\ h'$, is located in a compartment $h^2$, communicating, as through a passage-way $n$, with the purifying-chambers.

$o$ represents discharge-pipes leading from the purifying-chambers $g\ g'\ g^2$ and may communicate externally with a common discharge-pipe $o'$. The pans $j$, which form the bases of the purifying-chambers, are preferably inclined toward the center, where they are provided with a longitudinal trough $p$, which receives the precipitated impurities and with which the discharge-pipes $o$ communicate at one or more points.

$q$ is a discharge-outlet from the filtering-compartment $h^2$.

$r\ r$ are the chemical-reservoirs, (of which one or more may be used,) which contain the chemicals—such, e. g., as soda-ash, lime, or caustic soda—which are to be mixed with the water for the purpose of purifying it by precipitating the carbonates and other impurities that it may contain.

$s\ s$ are the discharge-pipes from the reservoirs $r\ r$, which supply the chemicals to the supply-pipe $c$, preferably through an automatic valve $s'$. The chemicals are preferably heated and forced from the reservoirs $r\ r$ under pressure by steam-pipes $t\ t$, which enter the reservoirs, and to maintain the chemicals in a heated condition while they are being conducted through the pipes $s\ s$ the steam-pipes and chemical-pipes may be arranged close together, as shown, or they may be inclosed in a common jacket $t'$, as shown in Fig. 3, or one of the pipes may be jacketed in the other.

$t^2\ t^2$ are blow-off or discharge pipes from the chemical-tanks.

It is desirable that the supply of the chemical purifying agents to the heater should be regulated automatically by the supply of the water or by the conditions existing within the heater. For this purpose I prefer to control the valve $s'$ by a float within the heater and preferably by a connection $s^2$ with the valve $e$ in the water-supply pipe, so that the valves $s'$ and $e$ will close simultaneously.

To compensate for any difference in movement of the valves $s'$ and $e$, I prefer to employ a yielding connection, such as the spring $s^3$, which will permit a slight further movement of the valve $e$ under the action of the float after the closing of the valve $s'$.

The water to be heated and purified is supplied by the pipe $c$ and enters the heater with the purifying agent or agents supplied by the pipe $s$. Steam enters through the inlet $b$ and is condensed by the water passing over the pans $d$. The heated water passes from the heater $a$ through the passage-way $k'$ into the filter and traverses the purifying-chambers $g$ $g'$ $g^2$ in succession. In the purifying-chambers the impure water assumes the lower level and fills the pockets formed by the barriers $m$, which act as settling or subsiding chambers to retain the water against forward movement while the carbonates and impurities are being precipitated. The purer water assumes the upper level above the barriers $m$ and passes thence through the series of purifying-chambers and finally to the filtering-chamber $h^2$, after traversing which it passes out through the outlet $i$ thoroughly purified and filtered. The impurites, which are precipitated upon the base-pans $j$, gravitate into the troughs $p$ and may be blown out from time to time through the discharge-pipes $o$.

By supporting the barriers $m$ in the manner described they are rendered removable and may be easily taken out, when desired, to remove any deposit that may be made upon them by the impurities contained in the water.

The details of construction shown may be varied without in any way departing from my invention.

What I claim as new, and desire to secure by Letters Patent, is as follows:

1. The combination with a feed-water heater, of a purifier consisting of a series of purifying-chambers arranged one above the other within the same inclosure and communicating with one another in series, the first purifier of the series communicating with the feed-water heater and receiving the water therefrom and the last of the series communicating with a discharge-outlet, said chambers being provided at their lower portions with a series of transverse barriers to the passage of the water but leaving a clear water-space in the upper part above said barriers for the passage of the lighter and purer water through each chamber to the next in the series and thence to the discharge-outlet.

2. The combination with a feed-water heater, of a purifier consisting of a series of purifying-chambers arranged one above the other within the same inclosure and communicating with one another in series, the first purifier of the series communicating with the feed-water heater and receiving the water therefrom and the last of the series communicating with a discharge-outlet, said chambers being provided at their lower portions with a series of transverse barriers to the passage of the water but leaving a clear water-space in the upper part above said barriers for the passage of the lighter and purer water through each chamber to the next in the series and thence to the discharge-outlet, and a filter interposed in said discharge-outlet and located within the same inclosure with the purifying-chambers.

3. The combination with a feed-water heater, of a series of purifying-chambers, communicating therewith and directly with one another in series, and provided at their lower portions with an obstruction or barrier to the passage of the water, forming a receptacle or pocket for the precipitated impurities, said purifying-chambers having a free passage-way for the water above said obstructions or barriers, and also discharge-outlets for the precipitated impurities.

4. The combination with a feed-water heater, of a purifier consisting of a series of purifying-chambers arranged one above the other within the same inclosure and communicating with one another in series, the first purifier of the series communicating with the feed-water heater and receiving the water therefrom and the last of the series communicating with a discharge-outlet, said chambers being provided at their lower portions with a series of transverse barriers to the passage of the water but leaving a clear water-space in the upper part above said barriers for the passage of the lighter and purer water through each chamber to the next in the series and thence to the discharge-outlet, and means to supply a purifying agent to said feed-water heater.

5. The combination with a feed-water heater, of a purifier communicating therewith and receiving the heated water therefrom and consisting of a series of communicating purifying-chambers each having a base-pan provided with a series of barriers or partitions forming an obstruction to the passage of the water over said pan, said purifying-chambers being further provided with a clear water-space above said barriers or partitions communicating directly with one another in succession and with an outlet passage-way for the purified water.

6. The combination with a feed-water heater, of a tank or reservoir to contain a purifying agent, a supply-pipe for supplying said purifying agent to the heater, means to force said purifying agent from said tank or reservoir through the supply-pipe, a purifier communicating with said heater and consisting of a chamber provided at its lower portion with a barrier or partition forming an obstruction to the passage of the water but leaving a clear water-space above said barrier or partition communicating with an outlet for purified water, and having a discharge-outlet for precipitated impurities leading from the base of said chamber.

7. The combination with a feed-water heater having a supply-pipe to supply the water to be heated, a supply-pipe to supply a purifying agent to said heater, valves in said supply-pipes automatically controlled by the conditions in said heater for regulating the supply of water and purifying agent, and a yielding connection between said valves whereby they are operated together and additional movement is permitted to one of said valves after the other is closed.

8. The purifier consisting of a chamber having an inlet for the water to be purified and a base-pan provided with a series of removable barriers or partitions forming an obstruction to the passage of the water over said pan, said chamber being further provided with a clear water-space above said barriers or partitions communicating with an outlet passage-way for the purified water and with a discharge-outlet from said base-pan for the impurities caught by said barriers or partitions.

9. The purifier, consisting of a chamber having an inlet for the water to be purified and a base-pan formed with a trough to receive impurities and having its surface inclining toward said trough, a series of barriers or partitions extending transversely over said pan and forming an obstruction for the passage of the water but leaving a clear water-space in the upper part above said barriers or partitions communicating with the outlet for purified water, and a discharge-pipe for the precipitated impurities leading from said trough.

10. The combination with a feed-water heater, of a purifier consisting of a series of purifying-chambers communicating directly with one another in series and each having one or more obstructions or barriers to the passage of water in the lower part leaving a clear space for the passage of water above said barriers, a discharge for precipitated impurities from each of said chambers, the first of said series of chambers communicating with said heater and receiving the water therefrom, and the last of said series communicating with the discharge-outlet for purified water.

11. The combination with a feed-water heater, of a purifier consisting of a series of purifying-chambers communicating directly with one another in series and each having one or more obstructions or barriers to the passage of water in the lower part leaving a clear space for the passage of water above said barriers, a discharge for precipitated impurities from each of said chambers, the first of said series of chambers communicating with said heater and receiving the water therefrom, and the last of said series communicating with the discharge-outlet for purified water, and a filter interposed between the last of said purifying-chambers and the discharge-outlet.

In testimony of which invention I have hereunto set my hand.

MILLARD P. OSBOURN.

Witnesses:
F. JOS. MILLER,
ERNEST HOWARD HUNTER.